(12) United States Patent
Fritz

(10) Patent No.: US 8,596,839 B2
(45) Date of Patent: Dec. 3, 2013

(54) LIGHTING ELEMENT FOR HOMOGENOUS APPEARANCE

(75) Inventor: Daniel Fritz, Stuttgart (DE)

(73) Assignee: SMR Patents S.a.r.l., Luxembourg (LU)

( * ) Notice: Subject to any disclaimer, the term of this patent is extended or adjusted under 35 U.S.C. 154(b) by 180 days.

(21) Appl. No.: 13/182,530

(22) Filed: Jul. 14, 2011

(65) Prior Publication Data

US 2012/0014126 A1 Jan. 19, 2012

(30) Foreign Application Priority Data

Jul. 15, 2010 (EP) ..................................... 10169611

(51) Int. Cl.
*H01L 33/02* (2010.01)
*G06M 7/00* (2006.01)

(52) U.S. Cl.
USPC ........................................... 362/494; 362/511

(58) Field of Classification Search
None
See application file for complete search history.

(56) References Cited

U.S. PATENT DOCUMENTS

| 6,784,603 B2 * | 8/2004 | Pelka et al. ................... 313/113 |
| 2006/0089732 A1 * | 4/2006 | Range .............................. 700/83 |
| 2006/0262550 A1 | 11/2006 | Pastrick et al. |
| 2007/0153546 A1 * | 7/2007 | Wu ................................ 362/612 |
| 2008/0106389 A1 | 5/2008 | Desai |
| 2008/0123194 A1 | 5/2008 | Hsu et al. |
| 2009/0168453 A1 * | 7/2009 | Koike et al. ................... 362/611 |
| 2010/0110728 A1 * | 5/2010 | Dubrow et al. ............... 362/615 |
| 2010/0220461 A1 * | 9/2010 | Naijo ........................... 362/97.1 |

FOREIGN PATENT DOCUMENTS

| DE | 102004054732 | 5/2006 |
| EP | 1652727 | 5/2006 |
| EP | 2151350 | 10/2010 |
| WO | 2008/111718 A1 | 9/2008 |

OTHER PUBLICATIONS

European Search Report for application No. EP 10 16 9611 dated Dec. 10, 2010.
German office action dated Aug. 10, 2012 (3 pages).

* cited by examiner

*Primary Examiner* — Ashok Patel
(74) *Attorney, Agent, or Firm* — Reising Ethington PC

(57) ABSTRACT

The invention is related to a lighting element for a homogenous light appearance used in automotive devices. The lighting element has a light guide structure illuminated by a LED that feeds light into the light guide at the edge of the light guide. The diffuser pane forms a diffuser layer on the light guide surface and light guide and diffuser layer consist of plastic material and are in integrally molded together in a 2-K molding process.

12 Claims, 6 Drawing Sheets

LIGHTING ELEMENT FOR HOMOGENOUS APPEARANCE

The invention is based on a priority patent application EP 10169611.0 which is hereby incorporated by reference.

BACKGROUND ART

Field of the Invention

The present invention relates to a lighting element for homogenous appearance for automotive use. Especially the lighting element is used in any opening along the outer contour of a vehicle and at an exterior rearview minor having at least one indicator light for several purposes.

More particular the lighting element is used as backside light for displays in automotive industry.

Driver assistant systems are known since years and are implemented more and more in vehicles. These assistant systems need indication element and displays as human-machine interfaces.

It is known to provide a blind spot detection/LCA system for a vehicle that detects the presence of another vehicle or object in the lane next to the host vehicle, where it may be difficult for the driver of the host vehicle to determine whether or not there is another vehicle or object adjacent to the host vehicle. Such a blind spot detection/LCA system often includes a visual indicator that visually indicates to the driver that another vehicle or object has been detected. The visual indicator (commonly a light emitting diode or the like) is often located at the reflective mirror element of the exterior rearview minor assembly and external of the vehicle cabin, or may be located interior to the vehicle, such as at the A-pillar of the vehicle within the interior of the vehicle cabin (such as on MY 2005 Volvo vehicle models equipped with camera-based BLIS systems). The visual blind spot/LCA indicators indicate or alert to the driver of the host vehicle the presence or impending presence of another vehicle in a blind spot in an adjacent side lane that typically cannot be readily seen within the field of view of the exterior minor reflective element of the exterior minor assembly mounted at that side of the vehicle and/or cannot be readily seen by the driver's peripheral vision or the like.

The visual blind spot/LCA indicators typically must be viewable principally or solely by the driver of the host vehicle and not by drivers of other vehicles. If the indicator is located external to the vehicle cabin, and especially since it is now common to use turn signals on exterior minors, any visibility of the indicator to the driver of another vehicle (such as a trailing vehicle or an overtaking vehicle) may cause confusion to the driver of the other vehicle as to whether or not the indicator is a turn signal indicator or some other vehicle lighting or the like. This may be particularly problematic when the blind spot indicator is located behind (and often supported by) the reflective minor element of the vehicle exterior mirror assembly, and may be especially confusing if other indicators are also disposed behind/supported by the mirror reflective element so as to function, for example, as turn signal indicators. For example, somewhat costly and complicated blind spot indicator constructions have been contemplated that, when placed behind and supported by the minor reflective element, attempt to have their projected beam of emitted light shielded from view by other drivers and attempt to be directed principally to be viewed by the driver of the host vehicle. This can be further complicated by the fact that the minor reflective element (and hence any blind spot indicator supported thereon/there behind) is adjustable via a minor actuator Thus, prior art blind spot/LCA indicators are often supported by and to the rear of the movable minor reflective element, so as to be viewable by a driver of the host vehicle through the reflective element of the minor assembly. For example, a transmissive window may be formed in the reflective coating or coatings of the reflective element and an illumination source or indicator may be positioned so as to direct or emit illumination through the window and toward the driver of the host vehicle so as to be viewable by the driver of the host vehicle.

Therefore, there is a need in the art for an improved blind spot/LCA indicator that is readily viewable by a driver of the host vehicle and not visible or viewable by a driver of another vehicle. In the EP 1652727 an indicator at the rear view minor is used, wherein the indicator light is adapted to avoid distortion of the driver. For this purpose a special optic with Fresnel lenses is used to adapt power of the light to the different views of drivers in different seat positions. Using the Fresnel lens the indicator shows an un-homogeneously lighted lens.

EP 2151350 A1 shows an indicator which is using a light guiding structure in which the light of LEDs is fed in. The light guide is covered with a separate lens that protects the electrical equipment.

It is also known from prior art to form a liquid crystal display with an active background light. The standard displays use a light element as a transparent pane with LEDs feeding light into this pane at the outer faces of the pane. To uniform the decoupled light a second pane or diffuser is mounted on top of the transparent pane. It is also know to use a diffuser foil on top of the light element to diffuse the light.

SUMMARY OF THE INVENTION

The intention of the invention is to provide a simple lighting element as indicator light for mass production which can be installed at different positions of a vehicle and an indicator that has a homogenous appearance for the driver with the same brightness over the whole indicator.

The invention provides a lighting element for a indicator with a display function that can be applied for automotive use.

The present invention provides a lighting element that comprises a bulky light guide body and a diffuser layer wherein the layer is directly molded on the surface of the light guide body.

The present invention provides an indicator or display that gives information to driver by indicating light or by displaying information.

The present invention provides an indicator light that is fixedly located at the minor housing or cover and/or at the base of an exterior rearview mirror, so as not to move or adjust when the minor reflective element is moved or adjusted to set its field of view.

Preferably, the indicator is fixedly located at the inboard wall or portion of the minor shell or casing, so as to be readily viewed by the driver of the host vehicle, while being substantially non-visible or non-viewable by a driver of another vehicle. The indicator is preferably located at an angled, outwardly extending rearward portion of the minor assembly that is angled so as to slope or extend at an angle away from the body side of the vehicle, so that indicator is generally facing the driver of the host vehicle and is readily viewable by the driver of the host vehicle and substantially non-visible or non-viewable by a driver of another vehicle at or approaching the host vehicle.

According to an aspect of the present invention, an exterior rearview mirror for a vehicle includes a reflective element, minor housing and an indicator. The indicator is located at and oriented at the inboard portion of the minor housing so as to be viewable by the driver of the vehicle and so as to be substantially to totally non-viewable by the drivers of other vehicular traffic, such as other vehicular traffic rearward of, sideward of, approaching, overtaking, forward of or otherwise at or near the host vehicle.

The inboard portion of the mirror housing (which at least in part defines a cavity within which the minor reflective element is disposed and within which the minor reflective element is adjustable) may comprise an inboard bezel of the minor housing. Typically, the exterior minor comprises base of the minor that extends from the side of the vehicle to where the minor housing is disposed.

According another aspect of the invention the A-column of the vehicle includes the indicator.

The indicator includes a light source such as at least one light emitting diode LED, and a light guiding device or element. A light guiding element, preferably at the minor housing are substantially disposed therein so as not to overly protrude to create aerodynamic drag and so as to provide an aesthetically pleasing exterior appearance and for directing the light emitted by the light source toward the driver for viewing by the driver of the host vehicle and, if required, for limiting or restricting viewing by drivers of other vehicles.

The present invention provides a light guiding element that is fed by at least one LEDs and covered with a diffusion layer to simulate a perfect homogenous light source.

These and other objects, advantages, purposes and features of the present invention will become apparent upon review of the following specification in conjunction with the drawings.

DETAILED DESCRIPTION OF THE DRAWINGS

Figure 1:
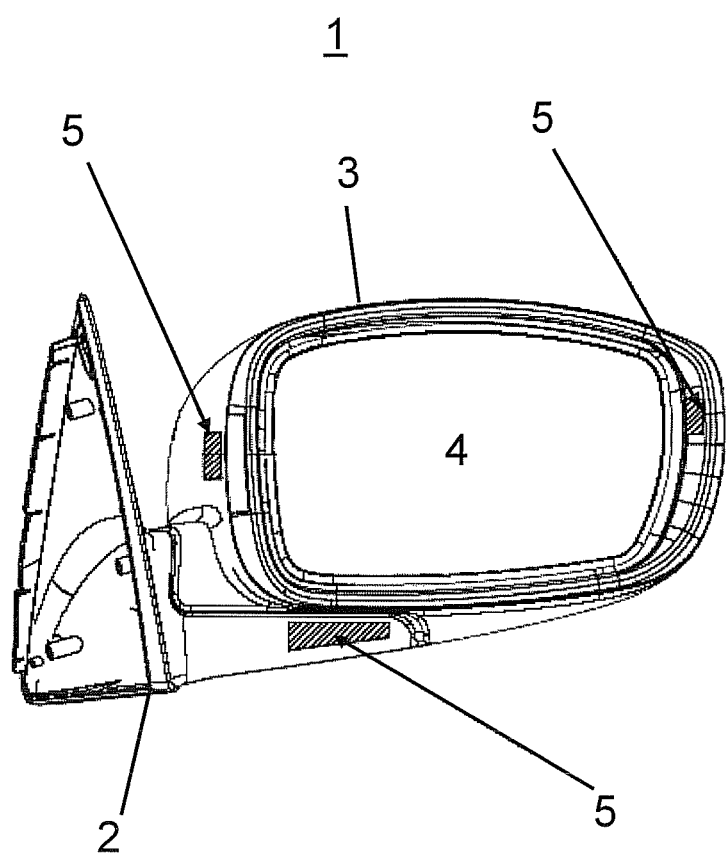
FIG. 1 shows examples of positions of an indicator light at a rear view mirror.

FIG. 1 shows a representative rear view minor 1 with a minor head 3 and a minor base 2. The minor head comprises a cavity in which a reflective element 4, the minor glass is installed. The rear view minor is designed to comprise all devices a person skilled in art would add to, for example: an actuator, a turn signal light, a security light to illuminate the ground adjacent to the vehicle, a power fold actuator, sensors, cameras, warning and indications light at positions the driver can see in the minor housing or behind the mirror glass.

The indicator light 5 is installed at different positions. The position as such is not important. The indicator light must be visible for the vehicle's driver and must not disturb other traffic members. The idea is that in a situation in which a vehicle is approaching the installed sensor system detects the vehicle and activates the indicator light. The indicator light glows up and driver is motivated to have a look over the shoulder.

Indicator light could be also used for other dangerous situations in driving. As an approach signal, if the distance between the vehicle and the vehicle travelling in the same direction in front is too close or if distance between vehicle and a parking vehicle at the side is too close. The indicator light 5 can be integrated into another light function as a turn signal light or a security light or a positioning light.

Figure 2:
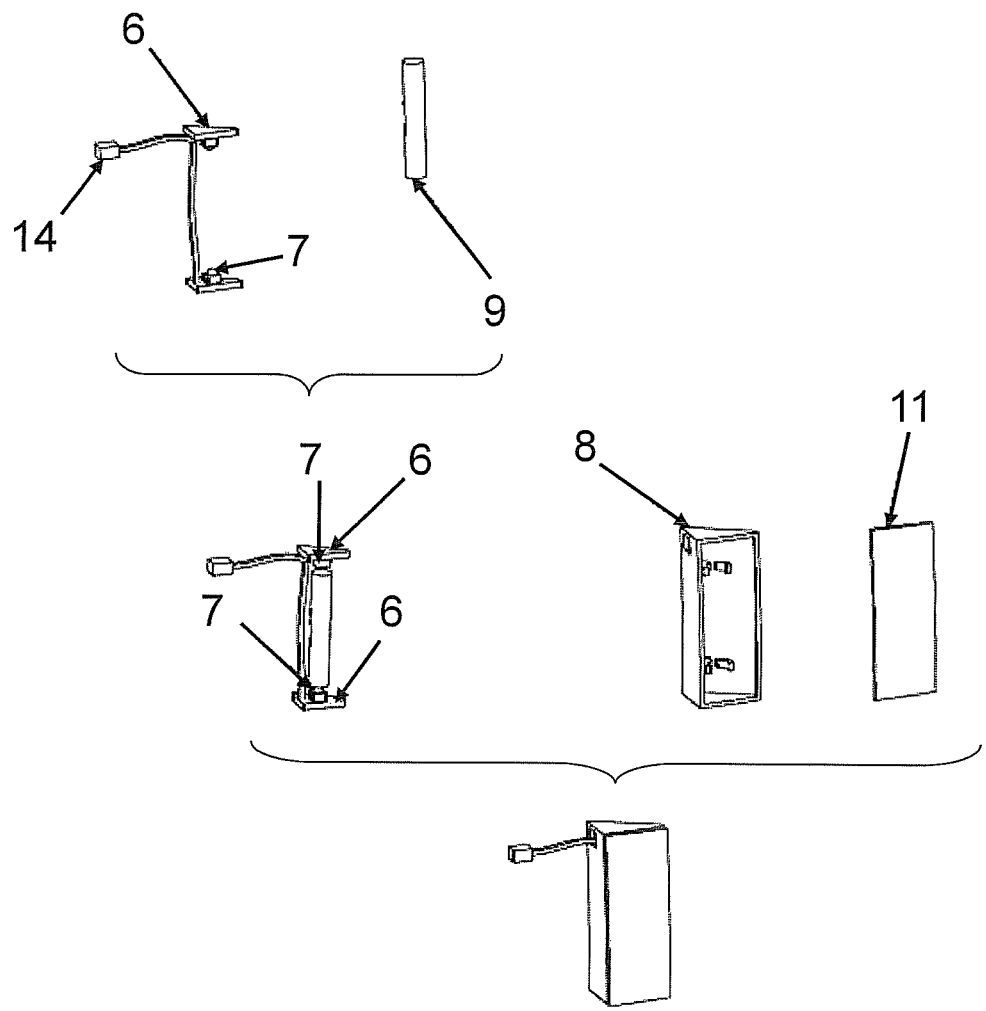
FIG. 2 and FIG. 3 shows a prior art solution of an indicator light
Figure 3:
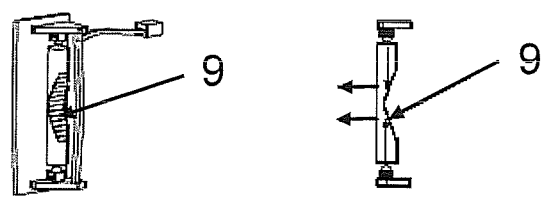

FIG. 2 shows an embodiment according prior art. The printed circuit board 6 is split into two parts connected to a single connector 14. The light guide 9 has the form of a cylindrical rod and is installed between the two parts of the printed circuit board and the light sources 7. A body 8 is hosting the printed circuit-light guide combination. Also, said body has the partially small hole at the other side so that wire connected PCB can be got out of the inner side of the body. The LED is placed on each PCB and a resistor and diode are placed on the one of said two split parts of the PCB. The two part of the split PCB are connected by wire so that the current flow is maintained. One of the two parts is connected to the control module of the blind spot detection system mounted into vehicle so that the power is supplied. An outer lens 11 covers the body 8. The outer lens comprises also a rim structure to clips the subassembly into the lens. The outer lens is installed on top of the light pipe. Said lens has a great variety of shapes because every mirror differs from external shape of its minor housing or according to the place to which the indicator is installed in the identical minor. As shown in FIG. 3 the light guide 9 is structured. The light guide shows riffles that allow light to couple out. The light guide has an indentation for a better out-coupling of light.

The inventional solution improves the aesthetical appearance of the indicator and the all over homogeneity of light for any kind of indication for a pure on/off function and a more informative display function too.

Figure 4:
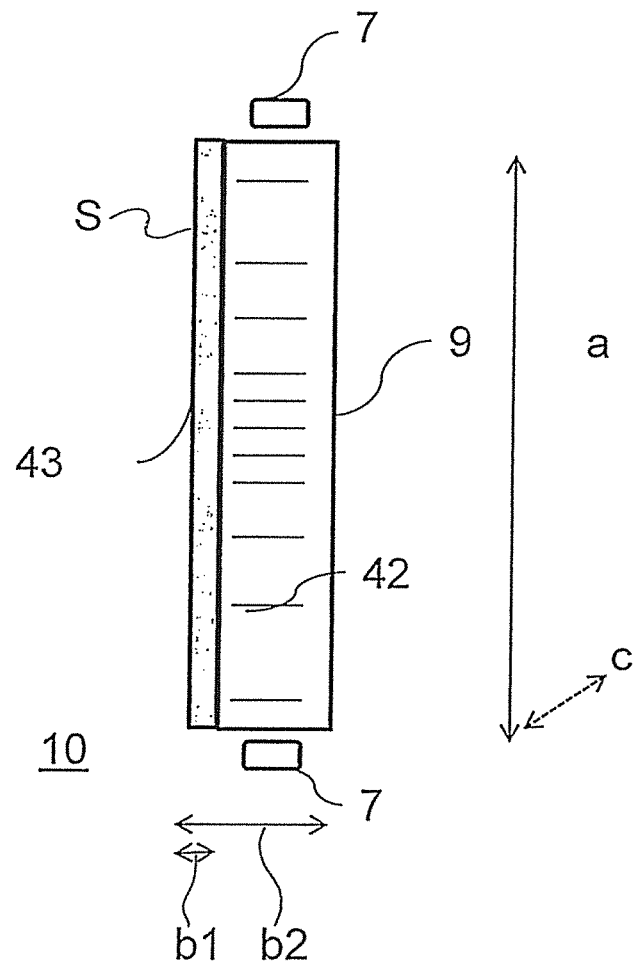
FIG. 4 shows a cross section through one embodiment of the invention

FIG. 4 shows the preferred embodiment lighting element solution. The lighting element 10 has a light guide 9 formed out of a plastic transparent material in form of a cuboid. The light guide is formed as a bulky element with the intention to have the extensions as of the light opening in the vehicle. Lateral lengths a and c form a surface S that is visible for the user. This surface S is the surface that appears for example in the opening of housing 3 in FIG. 1. The third length b2 is the material thickness of the light guide 9 in total. The visible face is covered by a diffuser layer 43 formed by a dispersive material that smoothes the light emission over the face. The layer 43 is in direct contact with the light guide body 9. The material combination of light guide 9 body and diffuser layer 43 must be adapted to fit for the index of refraction.

The material for layer 43 can be selected out of a group of materials that are colored with a white color or include particles to scatter the transmitting light. This function is well known in LC display technology, wherein a diffuser panel is implemented to distribute the light needed for the display uniformly across the LCD cell. On set of material is known from DE10336130 disclosing a poly methyl methacrylate (PMMA) matrix comprising spherical particles for scattering the light. Scattering agents composed of silicone and particularly preferably used are obtainable from GE Bayer Silicones with the trade names TOSPEARL® 120 and TOSPEARL® 3120. The scattering particles can be other organic or anorganic particles. The scattering agents have a refractive index slightly different form the matrix.

PMMA is a preferred material for the light guide, for it is highly transparent and scratch resistant. The light guide is produced in a mould injection process.

In one preferred embodiment of the invention layer 43 is molded directly on top of the face a×b in a 2-K-molding process. For the diffuser layer has the same matrix as the body of the light guide the layers fit well in refractions index and temperature behavior.

The diffuser layer has a thickness b1 that is in a preferred embodiment less than the half of total thickness b2 of light guide with diffuser layer.

The dimension of the light guide diffuser layer is defined by the surface a×c that defines the surface S. The axis c and/or b are longer than the total thickness b2 of the light guide-diffuser layer combination. The light guide-diffuser layer forms normally a plate that can be flat or follow the contour of the vehicle opening that can be curved. In a preferred embodiment the thickness of the total combination b2 is around 5 mm with a thickness of the diffuser layer b1 of around 2 mm.

Alternatively the plastic material can be ABS or PC which are also available as transparent material and as dispersive material too.

Alternatively the diffuser layer is molted on top of the light guide wherein the material has a different refractive index than the light guide. The refractive index step is then used to decouple light from the light guide into the diffuser layer and to diffuse the light effectively.

The appearance is a milky surface visible to the driver. The surface S is closing an opening in the vehicle for example in the rear view minor. The combination of light guide and diffuser layer 43 forms a functional combination of guiding light, diffusing light and closing the opening in a vehicle for example in a rear view mirror.

The light is provided by light sources, LEDs 7 that are arranged at the end faces of the light guide body 9. For small lighting elements a single LED is used to illuminate the whole surface S. The position of the LEDs at the edges of the light guide plate has the advantage that standard LED can be used that have a wide angle of luminescence. The coupling into a plate formed light guide at the edges is than very effective without loss of light.

The definition of the lighting element is a combination of light guide 9, diffuser layer 43 and at least one LED 7.

Figure 5:
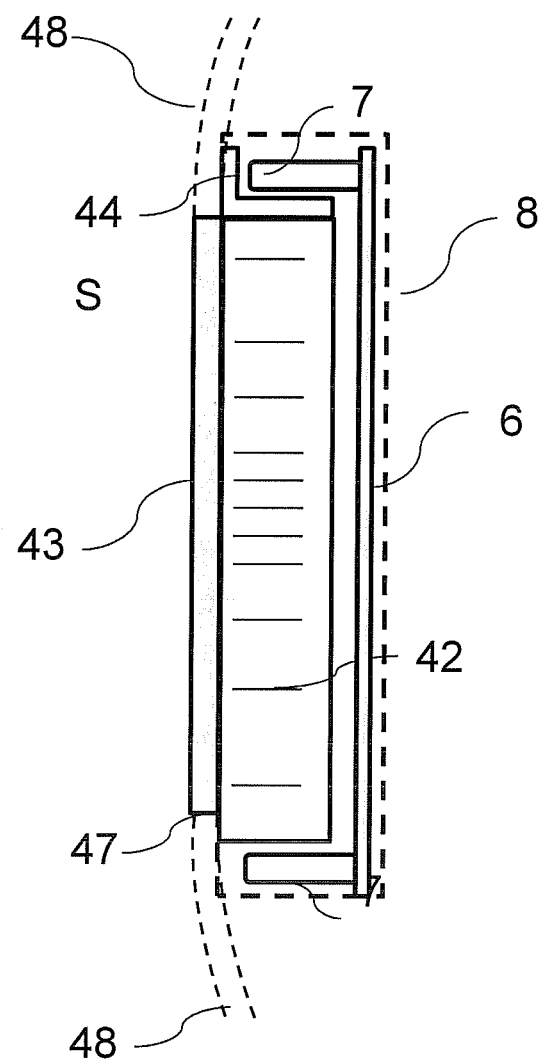
FIG. 5 shows a second embodiment of the invention

In FIG. 4 the printed circuit boards that bear the LEDs are not shown. But principally the LEDs are mounted either on split boards or on a single board, where preferably LEDs of side looker type are used, as shown in FIG. 5. Side looker LEDs are mounted with one of their faces on a printed circuit board emitting light along a main axis parallel to the board.

The light is coupled into the light guide end faces. The light guide has decoupling structures shown schematically as lines 42 in the light guide body, the decoupling structures can be ripples on the backside of the light guide or in-homogeny areas in the material engraved with a laser beam. Decoupling can be realized by curving the backside of the light guide body or by using both a structure in the light guide and an indentation.

In another embodiment the decoupling structures are on the top surface of the light guide covered by the diffuser layer.

In result the human machine interface is only visible as a homogenous light that shows the driver that the assistant system indicates a hazardous situation.

FIG. 5 shows a modification of the lighting element solution with two side looker LEDs 7 mounted on a single printed circuit board 6. The light guiding body shows on the upper side of the figure a lug 44 that extend to the long axis of the light guide body. This lug 44 is used to close the module with a housing or body 8 and for attaching the module in the prepared opening of the vehicle.

On the lower side of the figure the whole light guide body is longer than the diffuser cover layer. With both solutions an edge 47 between diffuser layer 43 and light guide body 9 is created. The edge 47 is pressed versus the mounting surface 48 of the vehicle. The diffuser layer 9 extends into the casing or into the lining and fills the opening in the material of the vehicle.

The constructive details of the housing and the attachment to the vehicle are not shown in the figures. The attachment is realized with technical solution known by persons skilled in the art.

The lighting element is used in an alternative design to create a human machine interface that has display function and can transport more information than a simple on-off lighted surface.

Figure 6:
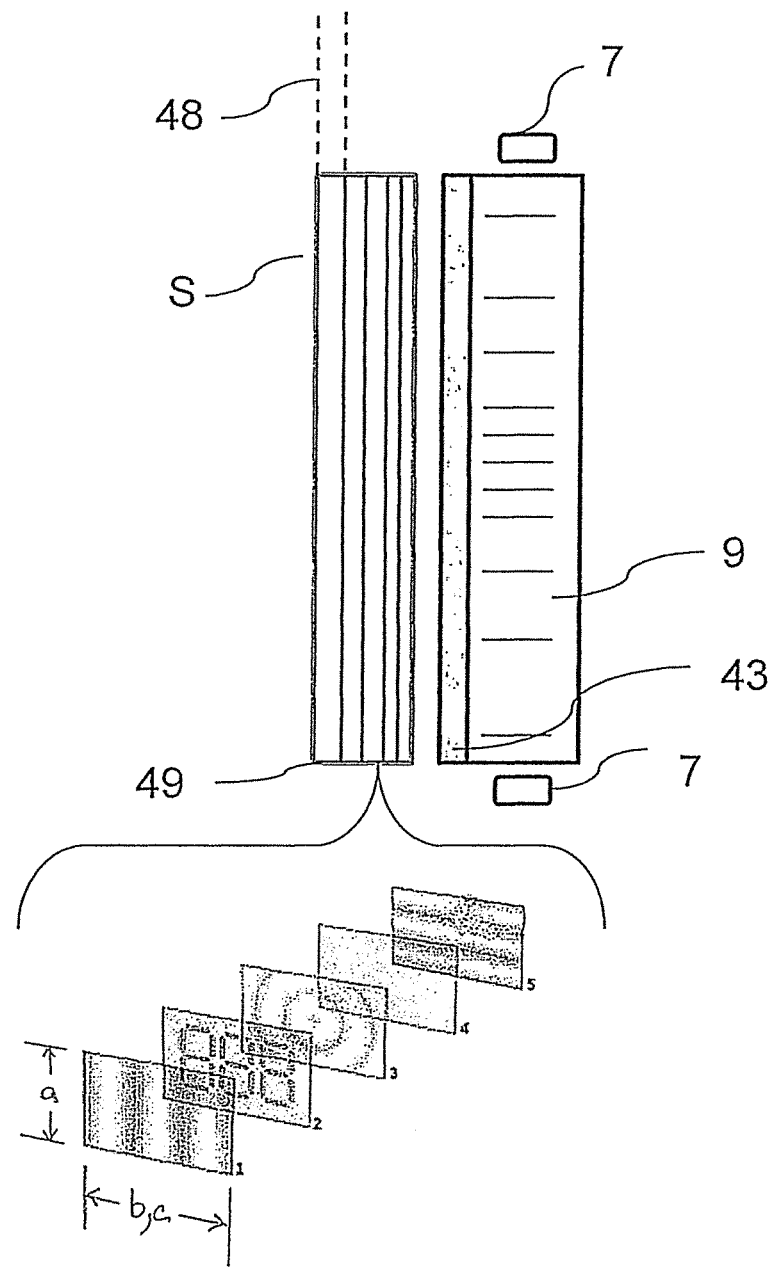
FIG. 6 shows a use of the invention

FIG. 6 shows schematically a liquid crystal display in front of the lighting element 9. The display structure is exploded in the upper detail showing an example of a reflective twisted nematic liquid crystal display. 49-1 is a polarizing filter film with a vertical axis to polarize light as it enters. 49-2 shows a glass substrate with ITO electrodes. The shapes of these electrodes will determine the shapes that will appear when the LCD is turned on. Vertical ridges etched on the surface are smooth. 49-3 is the twisted nematic liquid crystal material, 49-4 is a glass substrate with common electrode film (ITO) with horizontal ridges to line up with the horizontal filter. 49-5 is again a polarizing filter film with a horizontal axis to block/pass light.

Figure 7:
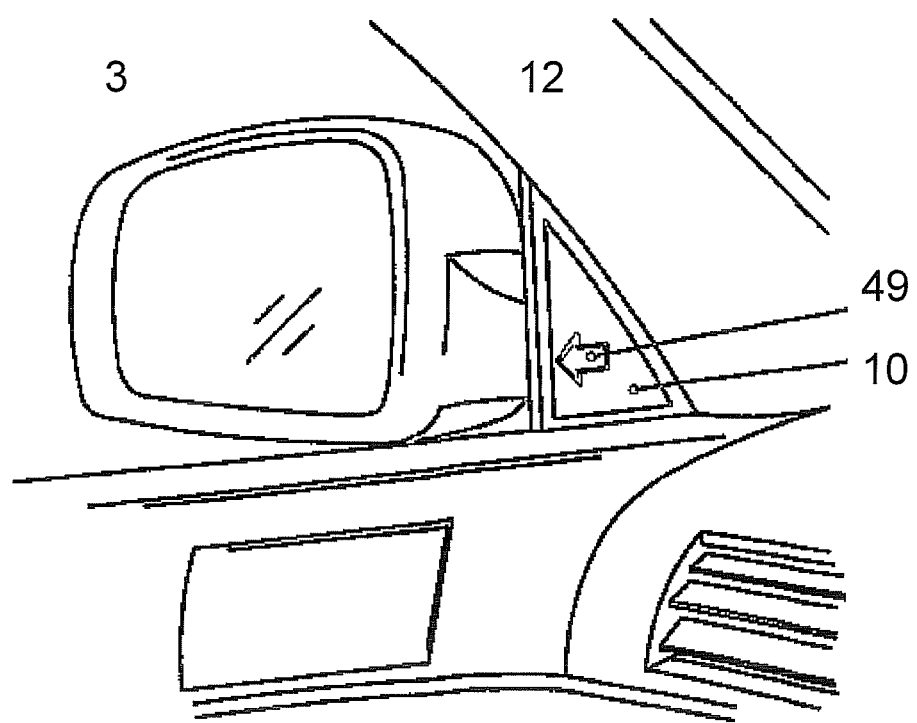
FIG. 7 shows an example of implementation.

The display element 49 with back light 9, 43, 7 is mounted into an opening of the vehicle for example in the interior of the vehicle in the A-column according FIG. 7. The lining of the A-column 12 has a cut out that is filled with the display 49 illuminated by lighting element 10. The liquid crystal display is one example of a display illuminated with the inventional lighting element. Also a display cell using electro-wetting technology can be illuminated by the lighting element.

The form of the display is adapted to the opening or the information that should be transferred. In the example the display has the form of a triangle and the display shows an arrow.

In one embodiment the display can show a scheme with a distance arrow and or a distance in meters. In another example the display can show an object. Or the display changes the colors in different hazardous situation or increase the color brilliance.

The invention is not limited to alert indicator displays. Also other displays in vehicles need to be alighted. For automotive use the temperature range requested for the devices is very broad. A solution according the invention which eases the back light improves the resistance against stress and temperature changes and the degradation during lifetime of the device.

The solution decrease the cost of the device the lighting element is produced out of one molding tool that allows 2 component molding. The material used is not limited to the example described in the application. Any plastic material able to be molded and is optically clear can be used.

REFERENCES

| | |
|---|---|
| Rear View Mirror | 1 |
| Base | 2 |
| Mirror Head | 3 |
| Reflective Element | 4 |
| Indication Light | 5 |
| Printed Circuit | 6 |
| LED | 7 |

-continued

| | |
|---|---|
| Housing | 8 |
| Light guide | 9 |
| Lighting element | 10 |
| Lens | 11 |
| A-Column | 12 |
| Diffuser layer | 43 |
| Lug | 44 |
| Edge | 47 |
| Mounting Surface | 48 |
| LC layers | 49 |

I claim:

1. A rear view mirror lighting element for a homogenous light appearance used in a vehicle, wherein the lighting element has a light guide structure defining a visible face illuminated by at least one LED that feeds light into the light guide at the edges of the light guide, and a diffuser pane, wherein a diffuser layer is integrally attached to the light guide surface and that light guide and the diffuser layer consist of plastic material and are directly molded together in a 2-K molding process, wherein the plastic material of the light guide includes decoupling structures, and the visible face of the light guide is covered by the diffuser layer formed by a dispersive material that smoothens emission of the light over the visible face.

2. A rear view mirror lighting element for a homogenous light appearance according to claim 1, characterized in that the plastic material of the light guide is out of the group PMMA, PC, ABS.

3. A rear view mirror lighting element for a homogenous light appearance according to claim 1, characterized in that the plastic material of the diffuser layer has dispersive particles hosted in a plastic matrix.

4. A rear view mirror lighting element for a homogenous light appearance according to claim 1, characterized in that the plastic materials have the same refractive index.

5. A rear view mirror lighting element for a homogenous light appearance according to claim 1, characterized in that the plastic material of the light guide has a curved backside.

6. A rear view mirror lighting element for a homogenous light appearance according to claim 1, characterized in that the lighting element is mounted in an opening of the vehicle, so that the diffuser layer fills the opening at the vehicle.

7. A rear view mirror lighting element for a homogenous light appearance according to claim 6, characterized in that the lighting element is mounted outside or in the interior of a vehicle.

8. A rear view mirror lighting element for a homogenous light appearance according to claim 1, characterized in that the lighting element is mounted on the backside of a display cell.

9. A rear view mirror lighting element for a homogenous light appearance according to claim 1, characterized in that the lighting element is at least part of a human machine interface that transports information to a user.

10. A rear view mirror lighting element for a homogenous light appearance according to claim 6, characterized in that the lighting element follows the form of the vehicle opening.

11. A rear view mirror lighting element for a homogenous light appearance according to claim 1, characterized in that the lighting element dimension is defined by a surface $S=a\times c$ wherein a is a height dimension of the rear view mirror lighting element, b is a thickness of the rear view mirror lighting element, c is a width of the rearview lighting element, and at least one of these axes is longer than the thickness of the diffuser layer element $b1$.

12. A rear view mirror lighting element for a homogenous light appearance according to claim 1, characterized in that a relation between thickness of the light guide and the diffuser layer $b2$ to thickness of the diffuser layer $b1$ is $b1<b2/2$.

* * * * *